United States Patent
Ryynänen et al.

(10) Patent No.: US 10,198,960 B1
(45) Date of Patent: Feb. 5, 2019

(54) COMPUTER IMPLEMENTED METHOD FOR PROVIDING FEEDBACK OF HARMONIC CONTENT RELATING TO MUSIC TRACK

(71) Applicant: Yousician Oy, Helsinki (FI)

(72) Inventors: Matti Ryynänen, Helsinki (FI); Oğuzcan Şehiralti, Helsinki (FI); Anssi Klapuri, Espoo (FI)

(73) Assignee: YOUSICIAN OY, Helsinki (FI)

( * ) Notice: Subject to any disclaimer, the term of this patent is extended or adjusted under 35 U.S.C. 154(b) by 5 days.

(21) Appl. No.: 15/701,733

(22) Filed: Sep. 12, 2017

(51) Int. Cl.
*G09B 15/00* (2006.01)
*G10G 3/04* (2006.01)
*G09B 15/02* (2006.01)

(52) U.S. Cl.
CPC ......... *G09B 15/003* (2013.01); *G09B 15/023* (2013.01); *G10G 3/04* (2013.01)

(58) Field of Classification Search
CPC .................................................. G09B 15/003
See application file for complete search history.

(56) References Cited

U.S. PATENT DOCUMENTS

| | | | | |
|---|---|---|---|---|
| 5,533,903 A * | 7/1996 | Kennedy | ................ | G09B 5/065 345/473 |
| 5,690,496 A * | 11/1997 | Kennedy | .............. | G09B 15/003 345/473 |
| 5,746,605 A * | 5/1998 | Kennedy | ................ | G09B 5/065 345/473 |
| 7,714,222 B2 * | 5/2010 | Taub | ..................... | G10H 1/0058 84/600 |
| 7,838,755 B2 * | 11/2010 | Taub | ..................... | G10H 1/0058 84/609 |
| 7,919,705 B2 * | 4/2011 | Miller | .................. | G09B 15/023 84/616 |
| 8,035,020 B2 * | 10/2011 | Taub | ..................... | G10H 1/0058 84/600 |
| 8,629,342 B2 * | 1/2014 | Lee | ......................... | G09B 15/00 84/477 R |
| 8,847,056 B2 * | 9/2014 | Hilderman | ............. | G10H 1/361 84/613 |
| 9,123,319 B2 * | 9/2015 | Hilderman | ............. | G10H 1/361 |
| 9,333,418 B2 * | 5/2016 | Lee | ......................... | G09B 15/00 |
| 9,418,642 B2 * | 8/2016 | Hilderman | ............. | G10H 1/361 |

(Continued)

*Primary Examiner* — Robert W Horn
(74) *Attorney, Agent, or Firm* — Ziegler IP Law Group, LLC

(57) ABSTRACT

A computer implemented method for providing feedback of harmonic content relating to a music track, includes receiving music track information; generating harmonic music track parameters based on the received music track information; displaying notation information for a user for performing the music track at a given time for the music track based on the harmonic music track parameters; receiving harmonic user content generated by an instrument performed by the user, using at least one capturing device; generating real-time performance feedback for the user based on comparison of the harmonic user content and the harmonic music track parameters according to predefined settings; receiving reference harmonic user content from a plurality of reference users over a public network; adjusting, based on the reference harmonic user content, at least one of the following: the predefined settings; and the harmonic music track parameters.

20 Claims, 6 Drawing Sheets

(56) References Cited

U.S. PATENT DOCUMENTS

| | | | |
|---|---|---|---|
| 9,626,946 B2* | 4/2017 | Hilderman | G10H 1/361 |
| 9,767,705 B1* | 9/2017 | Klapuri | G09B 15/00 |
| 2006/0150803 A1* | 7/2006 | Taub | G09B 15/023 |
| | | | 84/616 |
| 2007/0243915 A1* | 10/2007 | Egozy | G09B 5/06 |
| | | | 463/7 |
| 2014/0033899 A1* | 2/2014 | Dripps | G09B 5/06 |
| | | | 84/483.1 |
| 2014/0352520 A1* | 12/2014 | Citron | G09B 15/00 |
| | | | 84/470 R |
| 2017/0221466 A1* | 8/2017 | Hilderman | G10H 1/361 |
| 2018/0082606 A1* | 3/2018 | Jones | G09B 15/023 |
| 2018/0122260 A1* | 5/2018 | Walder | G09B 15/023 |
| 2018/0174559 A1* | 6/2018 | Elson | H04N 7/142 |

\* cited by examiner

COMPUTER IMPLEMENTED METHOD FOR PROVIDING FEEDBACK OF HARMONIC CONTENT RELATING TO MUSIC TRACK

TECHNICAL FIELD

The present application generally relates to a method, an apparatus and software code for providing a method for providing feedback of harmonic content relating to a music track. The present application further relates to a method, an apparatus and software code for crowdsourcing reference harmonic user content.

BRIEF DESCRIPTION OF RELATED DEVELOPMENTS

Learning to play a music instrument is common hobby and of interest for many people. However, learning to play the instrument for a beginner is challenging and often requires external teaching assistance.

Typically, when a beginner starts to exercise playing a music instrument it is important to have high motivation. Usually, beginners have high motivation in the beginning, but since repetitive practicing of tone sequences is required and the progress in learning is usually slow, a beginner often loses the inner motivation and stops practicing.

Some methods have been developed to imitate the playing of a music instrument. For example, there is a system that includes a special type guitar, which is played by pressing buttons instead of pressing strings. The system also includes software that is played in a game console. The user can select one of stored songs, after which the system shows on a display instructions for playing, i.e. the buttons to be pressed. Such a system makes playing with a special game guitar entertaining but it does not help much in learning to play a standard type guitar or other music instruments.

A user may want to learn to play a musical instrument (or sing) along with a musical piece. Before able to do so, it is required that the user has access to a digital audio source containing the desired musical piece, and furthermore, musical sounds reproduction apparatus, such as a musical instrument or singing voice.

However, there still exists a problem that musical notation or other similar instructions on how to play or sing a musical piece may not exist, or may not be available for the user. Also the user may not have access to a music teacher who could provide feedback for user's performance.

Prior known systems provide only partial solutions. For example, there are applications that are able to generate chords for publicly available music videos, for example. Some other applications may provide automatic feedback on user's performance correctness and timing accuracy.

Thus, an easy to set-up, easy to use, and highly functional solution is needed to provide improved feedback of harmonic content relating to a music track to a user for playing a music instrument in a manner that enables wide variety of music tracks played and improved accuracy for feedback with minimum steps required from the user.

SUMMARY

According to a first example aspect of the disclosed embodiments there is provided a computer implemented method for providing feedback of harmonic content relating to a music track, comprising:

receiving music track information;

generating harmonic music track parameters based on the received music track information;

displaying notation information for a user for performing the music track at a given time for the music track based on the harmonic music track parameters;

receiving harmonic user content generated by an instrument performed by the user, using at least one capturing device;

generating real-time performance feedback for the user based on comparison of the harmonic user content and the harmonic music track parameters according to predefined settings;

receiving reference harmonic user content from a plurality of reference users over a public network;

adjusting, based on the reference harmonic user content, at least one of the following:

the predefined settings; and the harmonic music track parameters.

In an embodiment, the method further comprises:

receiving instrument information; and determining notation information of the music track based on the received music track information and the instrument information, the notation information comprising instructive data for the user to perform the music track with the instrument.

In an embodiment, the instrument comprises at least one of the following:

a musical instrument played by the user; and a voice of the user.

In an embodiment, the method further comprises:

combining the received reference harmonic user content to provide crowdsourcing reference data;

comparing the crowdsourcing reference data with the harmonic music track content or the harmonic music track parameters; and adjusting the predefined settings, the harmonic music track content or the harmonic music track parameters based on the comparison.

In an embodiment, the harmonic user content comprises pitch data of user singing, and the method further comprising:

storing the pitch data as part of the crowdsourcing harmonic user content comprising pitch data from the plurality of reference users; and adjusting pitch data of the harmonic music track parameters based on the crowdsourcing harmonic user content according to consensus algorithm.

In an embodiment, the harmonic user content comprises chord data of user playing an instrument, and the method further comprising:

storing the chord data as part of the crowdsourcing harmonic user content comprising chord data from the plurality of reference users; and adjusting chord data of the harmonic music track parameters based on the crowdsourcing harmonic user content according to consensus algorithm.

In an embodiment, the method further comprises:

combining the received reference harmonic user content to provide reference data;

determining at least one portion of the reference data as fixed in response to determining the received reference harmonic user content from the plurality of users being within a pre-defined range, wherein the fixed portion expressing less room for variation of user performance;

determining at least one portion of the reference data as dynamic in response to determining the received reference harmonic user content from the plurality of users being outside the pre-defined range, wherein the dynamic portion expressing more room for variation of user performance; and adjusting, based on the fixed and dynamic portions, at least one of the following:
the predefined settings; and
the harmonic music track parameters.

In an embodiment, the method further comprises:
combining the received reference harmonic user content to provide crowdsourcing reference data by median calculating, wherein values of the received reference harmonic user content are arranged in ascending order and a middle value is selected.

In an embodiment, the method further comprises:
combining the received reference harmonic user content to provide crowdsourcing reference data by histogram calculating, wherein a value range of the received reference harmonic user content is subdivided using the histogram into parts, and calculated how many times a reference performance at a pre-defined point falls into each part, and selecting the part with most values.

In an embodiment, the method further comprises:
receiving instrument selection information;
receiving track selection information; and
determining input information regarding a music track and an instrument based on the instrument selection information and the track selection information.

In an embodiment, the method further comprises:
receiving reference harmonic user content of a plurality of reference users; and
combining the received reference harmonic user content to provide crowdsourcing reference data by consensus voting, wherein the consensus voting is based on weight information of each reference user so that number of votes of a user is determined by the weight information.

In an embodiment, the method further comprises:
combining the received reference harmonic user content to provide crowdsourcing reference data by consensus voting, wherein the consensus voting is configured to generate the crowdsourcing reference data by voting among the plurality of reference users for a plurality of time points in the harmonic user content and by applying reference user weight information on each reference user voting.

In an embodiment, the method further comprises:
generating the harmonic music track parameters based on the crowdsourcing reference data combined by the consensus voting; and
generating real-time performance feedback for the user based on comparison of the harmonic user content and the harmonic music track parameters.

In an embodiment, the method further comprises:
assigning same initial weight information for reference harmonic contents from each reference user; and
adjusting weight information of at least one reference user based on accuracy information or dependency information, wherein the accuracy information is generated by using time information reflecting portion of time the reference user's harmonic user content agrees with the crowdsourcing reference data combined by the consensus voting, and the dependency information is generated by using information reflecting number of occasions how often the reference user agrees at times where the reference user's harmonic user content does not agree with the crowdsourcing reference data combined by the consensus voting.

In an embodiment, the method further comprises:
repeating the step of adjusting weight information until the reference data combined by the consensus voting does not change, or a pre-defined maximum number of repetitions is reached; and
determining the resulting reference data by consensus voting as the crowdsourcing reference data.

In an embodiment, the method further comprises:
segmenting the visual information to generate a plurality of data segments within the visual information, wherein the plurality of data segments comprises at least a user data segment and an instrument data segment.

In an embodiment, the instrument data segment comprises information of a user operable element of the instrument.

In an embodiment, the user operable element comprises at least one of the following:
a fret;
a string;
a key; and
a button.

According to a second example aspect of the disclosed embodiments there is provided an apparatus for providing feedback of harmonic content relating to a music track, comprising:
a communication interface;
a user interface;
at least one capturing device;
at least one processor; and
at least one memory including computer program code;
the at least one memory and the computer program code configured to, with the at least one processor, cause the apparatus to:
receive music track information by the communication interface;
generate harmonic music track parameters based on the received music track information;
display notation information on the user interface for a user for performing the music track at a given time for the music track based on the harmonic music track parameters;
receive, by the capturing device, harmonic user content generated by an instrument performed by the user;
generate real-time performance feedback for the user based on comparison of the harmonic user content and the harmonic music track parameters according to predefined settings;
receive reference harmonic user content from a plurality of reference users over a public network;
adjust, based on the reference harmonic user content, at least one of the following:
the predefined settings; and
the harmonic music track parameters.

According to a third example aspect of the disclosed embodiments there is provided a computer program embodied on a computer readable non-transitory medium comprising computer executable program code, which when executed by at least one processor of an apparatus, causes the apparatus to:
receive music track information by the communication interface;
generate harmonic music track parameters based on the received music track information;
display notation information on the user interface for a user for performing the music track at a given time for the music track based on the harmonic music track parameters;
receive, by the capturing device, harmonic user content generated by an instrument performed by the user;

generate real-time performance feedback for the user based on comparison of the harmonic user content and the harmonic music track parameters according to predefined settings;

receive reference harmonic user content from a plurality of reference users over a public network;

adjust, based on the reference harmonic user content, at least one of the following:

the predefined settings; and the harmonic music track parameters.

Different non-binding example aspects and embodiments of the disclosure have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The aspects of the disclosed embodiments will be described, by way of example only, with reference to the accompanying drawings, in which.

DETAILED DESCRIPTION

In the following description, like numbers denote like elements.

Figure 1:
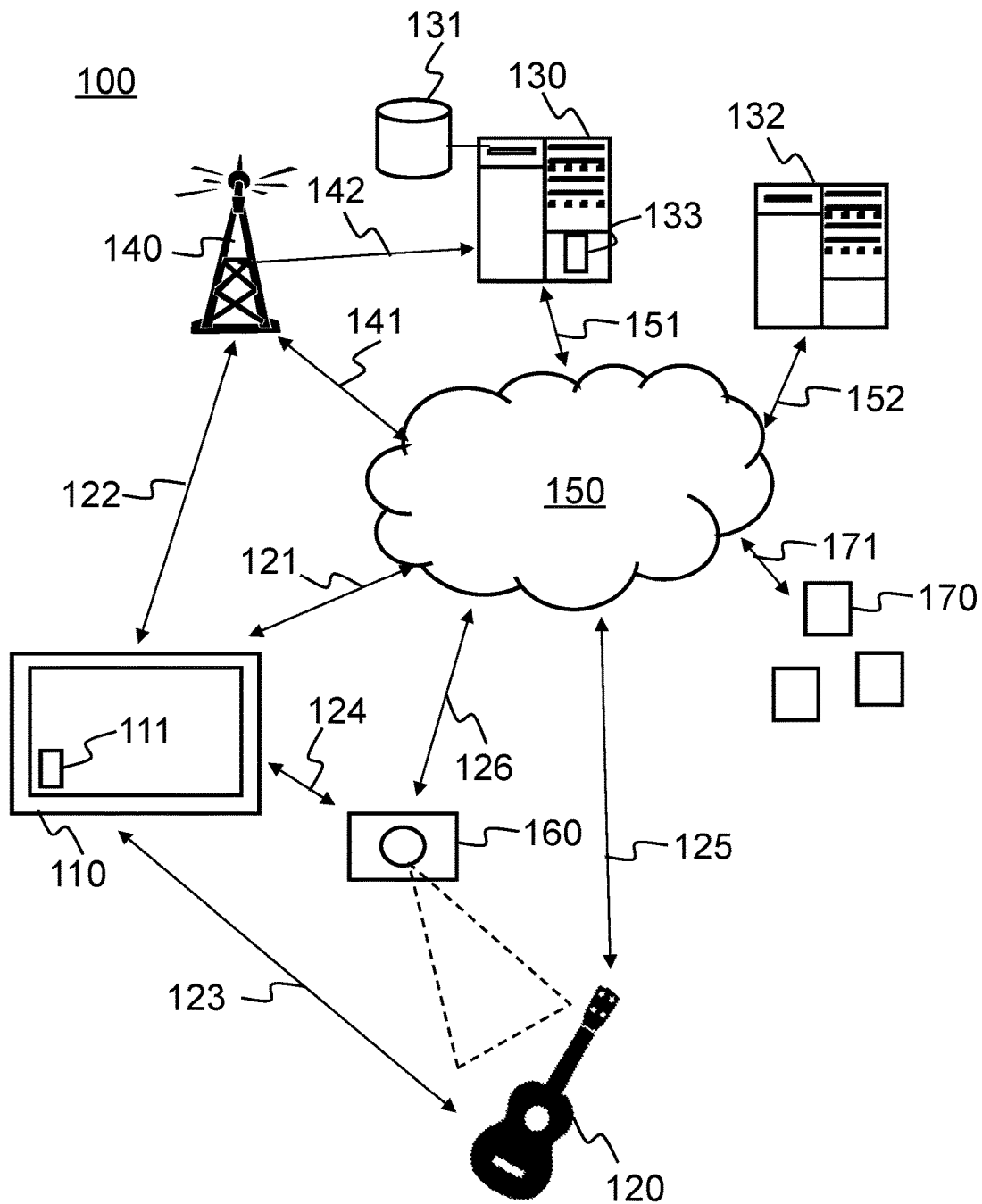
FIG. 1 shows a schematic picture of a system according to an aspect of the disclosed embodiments.

FIG. 1 shows a schematic picture of a system 100 according to an example embodiment. A user device 110 may comprise a portable terminal comprising a communication interface, for example. The user device 110 is capable of downloading and locally executing software program code. The software program code may be a client application 111 of a service whose possible server application 133 is running on a server apparatus 130, 132 of the system 100. The user device 110 may comprise a capturing device 160, such as a camera and/or microphone for providing real time AV signals. The camera may also be used to provide video stream for a multimedia connection and a microphone may be used for providing audio stream for the multimedia connection, for example. The user device 110 is configured to be connectable to a public network 150, such as Internet, directly via local connection 121 or via a wireless communication network 140 over a wireless connection 122. The wireless connection 122 may comprise a mobile cellular network or a wireless local area network (WLAN), for example. The wireless communication network 140 may be connected to a public data communication network 150, for example the Internet, over a data connection 141. The user device 110 is configured to be connectable to the public data communication network 150, for example the Internet, directly over a data connection 121 that may comprise a fixed or wireless mobile broadband access. The wireless communication network 140 may be connected to a server apparatus 130 of the system 100, over a data connection 142.

In an embodiment, a user device 110 (mobile phone, tablet, smart television or computer) sets up local connections 123, 124 with at least one of the capturing device 160 and a musical instrument 120. The capturing device 160 may be integrated to the user device 110 or arranged as separate device and connectable over local connection 124.

Capturing may be carried out via a device microphone, or with an external capturing device (such as an external microphone) or within the instrument 120 (such as an electric guitar or MIDI keyboard, for example) that is connected with a cable to a user device 110, such as to a computer USB port, for example.

The user device 110 comprises a client application 111 and the capturing device 160 and/or the instrument 120 may just accept an invite (sent via a communication link locally or remotely over network 150) to join a session, for example.

The user device 110 client application 111 may allow the user device 110 to log into a music exercise service run on a server 130,132 for example. The user device 110 may send invitation for collaboration to contacts maintained within the user device 110.

At least one of a user apparatus 110, 160 or a server apparatus 130, 132 receives music track information and generates harmonic music track parameters based on the received music track information. Notation information is displayed at the user apparatus 110, 160 for a user for performing the music track at a given time for the music track based on the harmonic music track parameters. The user may sing or play a musical instrument 120, such as a guitar. User vocal may be understood as a musical instrument 120 in certain embodiments. Harmonic user content generated by the musical instrument 120 that is performed by the user is received using at least one capturing device 160. Real-time performance feedback is generated for the user based on comparison of the harmonic user content and the harmonic music track parameters according to predefined settings.

Furthermore, reference harmonic user content is received from a plurality of reference user devices 170 over a public network 150. The reference user device 170 may be connected over local connection 171 to the public network 150. Alternatively, a reference user device 170 may be connected locally to the user device 110. The user device 110 may also be configured to operate as a reference user device 170 when seen from the viewpoint of the other users (who operate on reference devices 170). Thus devices 110 and 170 may be in fact similar, and a user just sees the entity from the viewpoint of himself/herself, whose device is labeled as the user device 110, and the devices of other users are labeled as reference user devices 170.

Based on the reference harmonic user content received from a plurality of reference users, at least one of the following: the harmonic music track content and the harmonic music track parameters, may be adjusted automatically.

Thus a user of the user device 110 is provided with feedback on sounds the user is producing along with a user-selected musical piece. The harmonic content of the accompanying musical piece is first analyzed and shown to the user during his performance.

The harmonic content of the accompanying musical piece may be analyzed within the user device 110 or within the server apparatus 130, 132.

Also the user-produced musical sounds are analyzed in real-time during the musical performance by at least one of the capturing device 160 and the user device 110. Initial feedback to the user may be given based on measuring the difference between harmonic content of the musical piece and harmonic content of the user performance (performed using the instrument 120, such as a guitar or user voice, for example) received by the capturing device 160.

Advantageously, when several users (using reference user devices 170) have performed the same musical piece, results of analyzing the performances of a plurality of references users can be combined to increase the accuracy of the user feedback (provided by the user device 110) and/or the accuracy of the analysis of the accompanying music. In other words, feedback instructions may be continuously refined via crowdsourcing, whereas the initial feedback instructions may be analyzed directly from original music track data and captured user performance.

A capturing device 160 (e.g. a microphone and/or a camera) may capture and send a real time AV content to the user device 110 over a peer-to-peer connection formed over a WiFi, mobile or other network, for example.

The user device 110 may be connected to a plurality of different capturing devices 160 and instruments 120 and the user device 110 may be configured to select which devices 120, 160 is actively collaborated with. For example, a user of the device 110 may control which stream (or streams) received from the devices 120, 160 is received by the user device 110. The user device 110 may choose one of the streams that the device 110 may decode and process for further processing.

In an embodiment, a reference user device 170 may be similar to the user device 110 and comprise corresponding elements and functionalities.

The user device 110 may need to be logged in with user credentials to a chosen service of the network server 130, 132.

In an embodiment, AV streams may be sent via a peer-to-peer connections 123, 124 from wireless device(s) 120, 160 to the user device 110 (not via cloud server), or over mobile network or WiFi 122, 140. The connections 122, 123, 124 may be wireless or wired.

The user device 110 may show all incoming real time AV streams on device 110 screen and user device 110 user may choose any available stream by e.g. clicking on it and utilizing the selected content.

In an embodiment, the system 100 comprises an instrument 120 configured to be connectable to the user device 110 over a local connection 123. The local connection 123 may comprise a wired connection or a wireless connection. The wired connection may comprise Universal Serial Bus (USB), High-Definition Multimedia Interface (HDMI), SCART interface or RCA interface, for example. The wireless connection may comprise acoustic connection, Bluetooth™, Radio Frequency Identification (RF-ID) or wireless local area network (WLAN), for example. Near field communication (NFC) may be used for device identification between the instrument 120 and the user device 110, for example. The instrument 120 may comprise a guitar, a vocal (human voice), a piano, an ukulele, a bass, a saxophone or a trumpet, for example. The instrument 120 may also be connected directly to the public network 150, such as Internet, via direct local connection 125 or via a wireless cellular network connection 140, 141.

In an embodiment, the system 100 comprises a capturing device 160 configured to be connectable to the user device 110 over a local connection 124. The local connection 124 may comprise a wired connection or a wireless connection. The wired connection may comprise Universal Serial Bus (USB), High-Definition Multimedia Interface (HDMI), SCART interface or RCA interface, for example. The wireless connection may comprise Bluetooth™, Radio Frequency Identification (RF-ID) or wireless local area network (WLAN), for example. Near field communication (NFC) may be used for device identification between the capturing device 160 and the user device 110, for example. The capturing device 160 may comprise a camera, a microphone, or a combination of a camera and a microphone, for example. The capturing device 160 may also be connected directly to the public network 150, such as Internet, via direct local connection 126 or via a wireless cellular network connection 140, 141.

In an embodiment, the system 100 may comprise a server apparatus 130, which comprises a storage device 131 for storing service data, service metrics and subscriber information, over data connection 151. The service data may comprise configuration data, account creation data, music track information; harmonic music track parameters; notation information; harmonic user content; performance feedback information, predefined settings, reference harmonic user content, instrument data, and attribute data, for example.

In an embodiment, a proprietary application in the user device 110 may be a client application 111 of a service whose server application 133 is running on the server apparatus 130 of the system 100.

Figure 5:
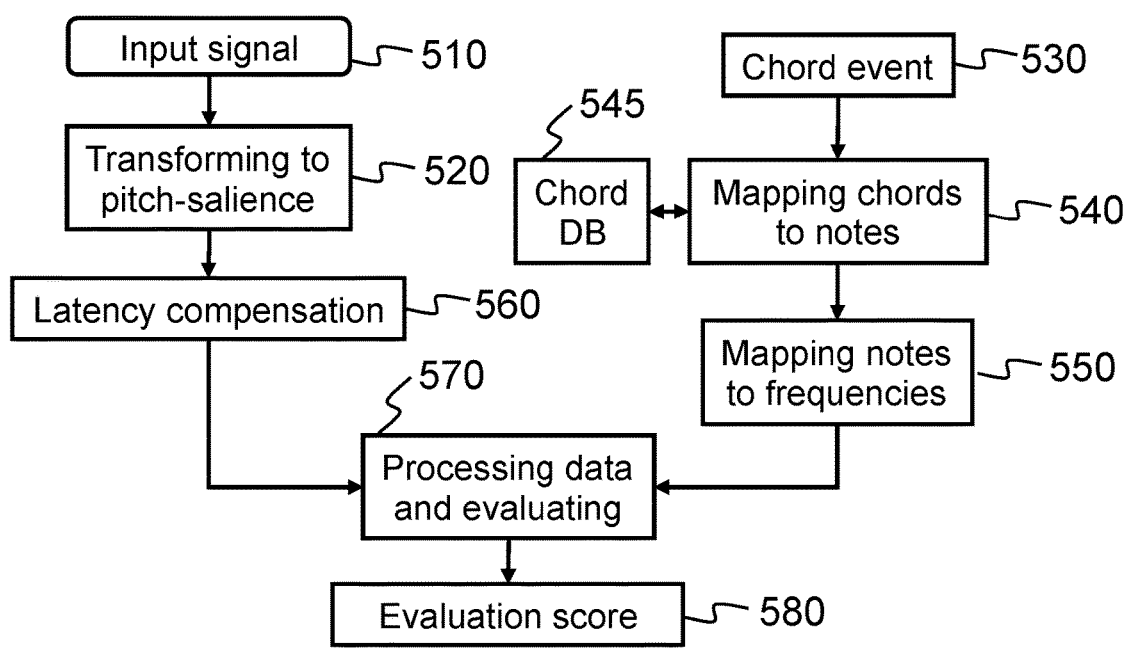
FIG. 5 shows a flow diagram showing operations in accordance with an example embodiment.
Figure 6:
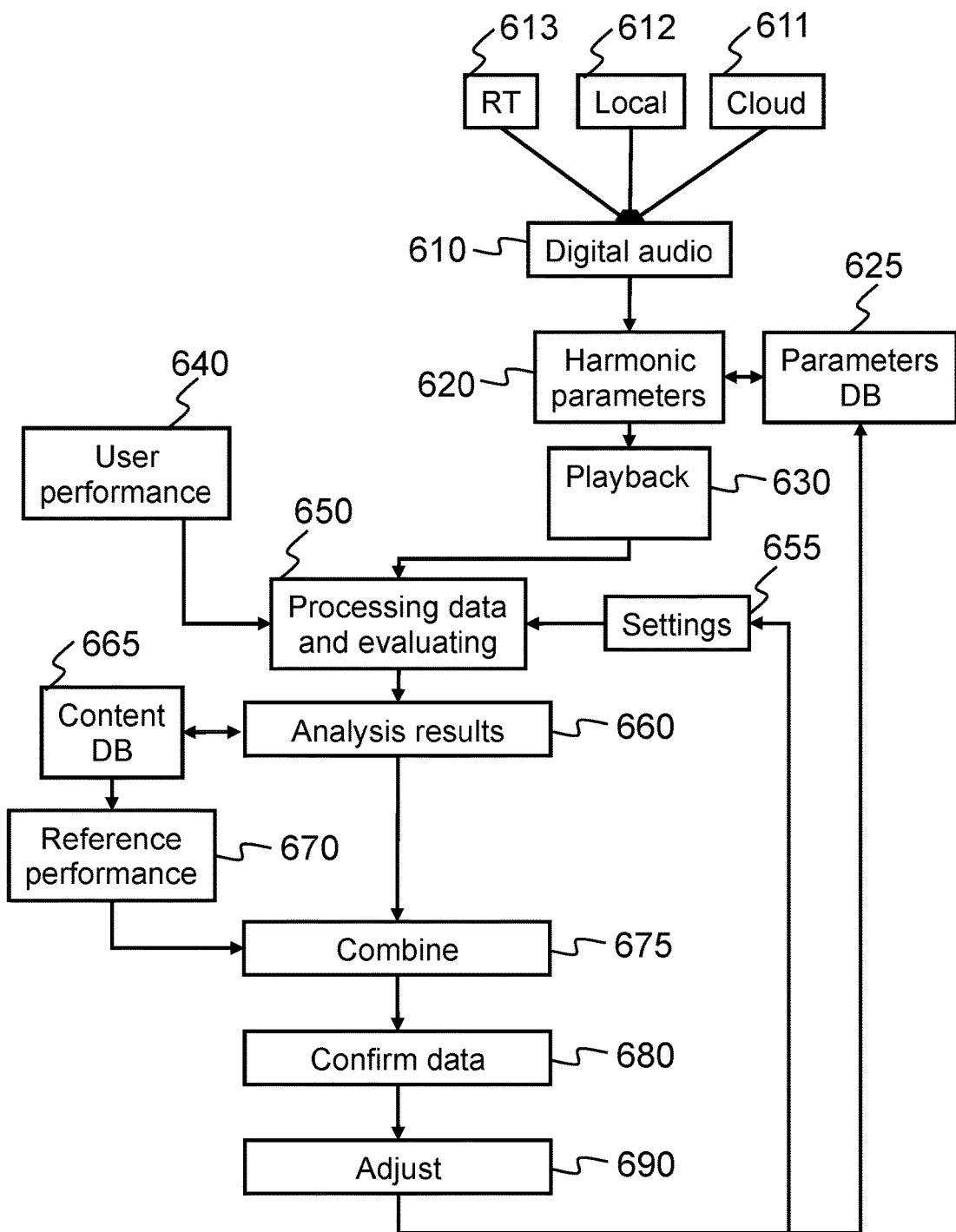
FIG. 6 shows a functional diagram of an exemplary method for analyzing playing of a user in connection with an example embodiment.
Figure 7:
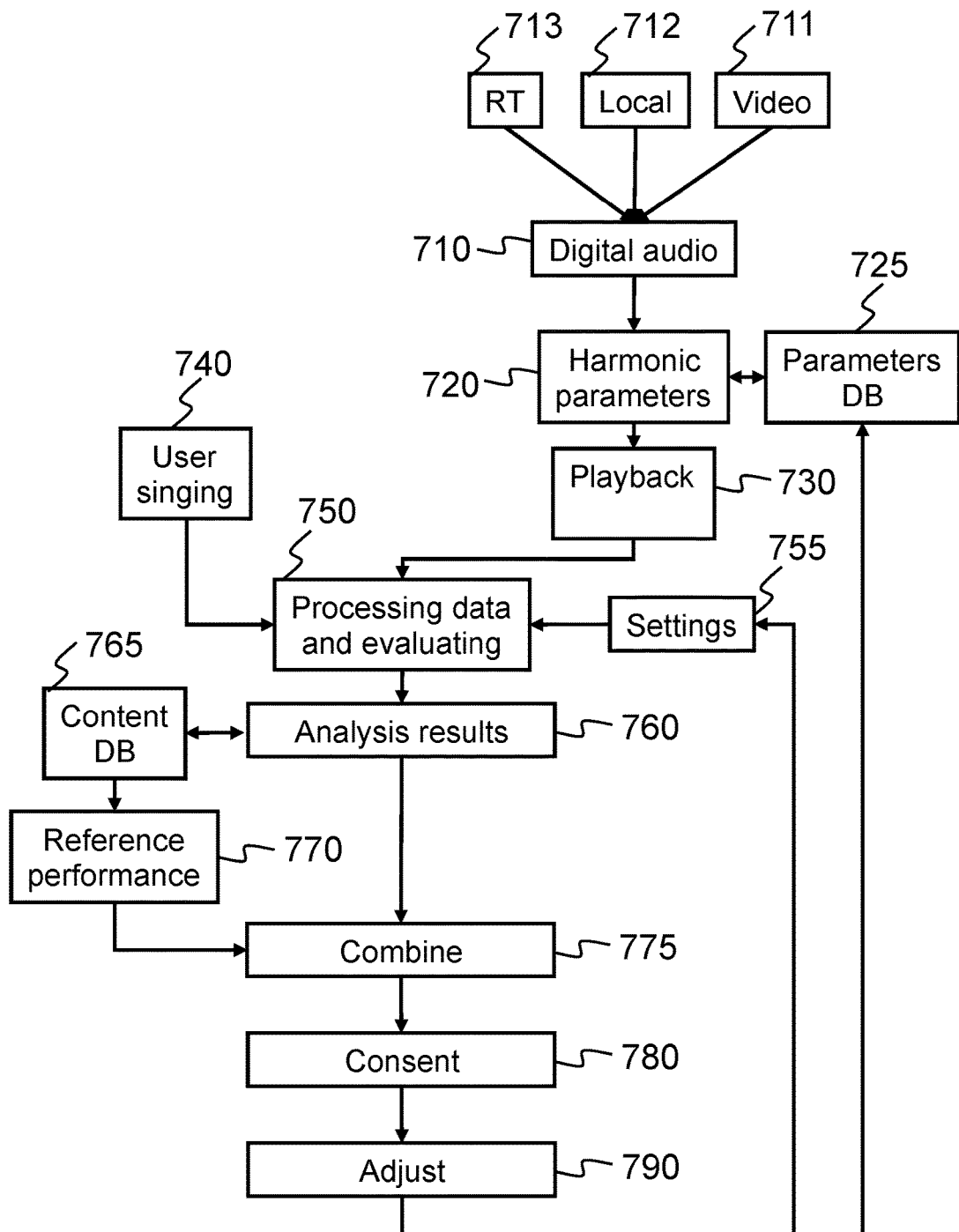
FIG. 7 shows a functional diagram of an exemplary method for analyzing singing performance of a user in connection with an example embodiment.

For a user device 110, the client application 111 may comprise a simple webapp/website (or Android/IOS Native app, for example) configured to provide functionalities illustrated relating to FIGS. 5-7, for example.

The proprietary application 111 of the user device 110 receives user input data and provides the user output data. The user input data may comprise real time audiovisual content captured by the capturing device 160, such as a microphone and/or camera. The microphone may be located in at least one of the capturing device 160, the instrument 120 or the user device 110, for example. Content may be transceived over local connections 123, 124, as shown. The local connection 123 may comprise an acoustic connection.

In an embodiment, configuration information or application download information for any of the user device 110, the capturing device 160, the instrument 120 and the system server 130 may be automatically downloaded and configured by the server 130. Thus the user of the devices 110, 120, 160, 170 may not need to do any initialization or configuration for the service. The system server 130 may also take care of account creation process for the service, such as real time AV service between the user device 110 and the capturing device 160.

In an embodiment, the user device 110 and at least one of the capturing device 160 and the instrument 120 may be associated using one of many different methods, such as by entering a unique user ID or email address, by entering a unique token (which can be text or e.g. a QR code) or using, for example, some external service, such as Google's Nearby API which is a publish-subscribe API that lets you pass small binary payloads between internet-connected Android and iOS devices. Such devices do not have to be on the same local network, but they do have to be connected to the Internet 150. Nearby uses a combination of e.g. Bluetooth, Bluetooth Low Energy, Wi-Fi and near-ultrasonic audio to communicate a unique-in-time pairing code between devices. The server 130 may facilitate message exchange between devices 110, 120, 160 that detect the same pairing code. When a device detects a pairing code from a nearby device, it sends the pairing code to the Nearby Messages server 130 for validation, and to check whether there are any messages to deliver for the application's current set of subscriptions.

In an embodiment, the association of the devices 110, 120, 160, 170 can be one-time or stored persistently on any of the devices 110, 120, 160, 170 or the server 130, 132.

In an embodiment, the peer connection 124 between the capturing device 160 and the user device 110 can be two-way (even though captured AV content only goes from capturing device 160 to user device 110) because e.g. control commands or other messaging could be going in the other direction from user device 110 to the capturing device 160 over the peer connection.

In an embodiment, the real time session over connection 124 may comprise a real time WebRTC session or other similar live session.

In an embodiment, real time content captured by the capturing device 160 may comprise mixed content of both audio and video, for example.

In an embodiment, a system may comprise a master device 110, at least one slave device 120, 160 and a service server 130,132. The (e.g. wireless) slave(s) 120, 160 may capture AV content and send the AV content to the master device 110. However, the slave(s) 120, 160 can also send the AV content to the streaming service directly and the master device 110 may send selection information to the streaming service 130,132 to decide which slave output is received at a time. Such approach can be alternative for the master device 110 option.

In an embodiment, a user device 110 is configured to use a capturing device 160, such as a camera device for capturing video, and configured to use a microphone of the user device 110 for capturing audio relating to the instrument 120 played by the user.

In an embodiment, a user device 110 is configured to use a capturing device 160, such as a camera device for capturing video, and configured to use an audio input of the user device 110 for receiving audio captured by a microphone of the instrument 120 played by the user.

In an embodiment, a user has a client application 111 ("Music playing exercise app") installed in the user device 110. Optionally, corresponding client application(s) may be installed on a capturing device 160, reference device 170 and the instrument 120 that can pair devices with the client application 111 to enable association of the devices 110, 120, 160, 170 and to further provide enhanced service.

In an embodiment, the user device 110 and the capturing device 160 or the instrument 120 do not have to be connected locally for pairing. The user device 110 and the external devices 120, 160 can be paired also so that the user device 110 is connected to a mobile network over connection 121 and therefrom to the Internet 150 for example, and the external devices 120, 160, 170 are connected over local connections 125, 126 to a local WLAN network 140 or directly to the Internet 150 and eventually to the user device 100 for pairing, for example, even via the server 130.

In an embodiment, a capturing device 160 is mounted on the musical instrument 120 instead of using a capturing device integrated to the user device 110, or a capturing device mounted on a table, a floor or user's head, for example.

In an embodiment, authentication of a user device 110 on a system server 130 may utilize hardware or SIM credentials, such as International Mobile Equipment Identity (IMEI) or International Mobile Subscriber Identity (IMSI). The user device 110 may transmit authentication information comprising IMEI and/or IMSI, for example, to the system server 130. The system server 130 authenticates the user device 110 by comparing the received authentication information to authentication information of registered users stored at the system server database 131, for example. Such authentication information may be used for pairing the devices 110, 120, 160, 170 to generate association between them for a AR session connection.

In an embodiment, a peer-to-peer multimedia connection may be enabled by one of a multitude of client applications 111 that are components of a user device 110 application. Third party account credentials (usernames, passwords, etc.) may be hosted by the system server 130 and utilized when needed for exercising of playing a music instrument 120, for example.

In an embodiment, a service web application may be used for configuration of a system. The service web application may be run on any user device 110, admin device, or a remote control apparatus, such as a personal computer connected to a public data network, such as Internet 150, for example. The control apparatus may also be connected locally to the user device 110 over a local connection and utilize the network connections of the user device 110 for configuration purposes. The service web application of the control apparatus may provide searching/adding instruments, determining attributes for tracks, personalizing screen names, personalizing visual instructions, device setup and configuration such as Wi-Fi Setup and user device 110 configurations, for example. The service web application of the control apparatus may be a general configuration tool for tasks being too complex to be performed on the user interface of the user device 120, for example.

In an embodiment, a remote control apparatus may be authenticated and configuration data sent from the control apparatus to the system server 130, 131 wherein configuration settings for the user device 110 are modified based on the received data. In an embodiment, the modified settings may then be sent to the user device 110 over the network 150 and the local connection or the wireless operator. The modified settings may also be sent to external devices 120, 160 correspondingly, through the user device 110, or directly over the network 150, for example.

In an embodiment, the user device 110, the instrument 120 and a capturing device 160 may be wireless or wired.

In an embodiment, the method comprises combining the received reference harmonic user content to provide crowd-sourcing reference data by histogram calculating, wherein a value range of the received reference harmonic user content is subdivided using the histogram into parts, and calculated how many times a reference performance at a pre-defined point falls into each part, and selecting the part with most values.

In an embodiment, the method further comprises combining the received harmonic user content to provide crowd-sourcing reference data by data fusion through the following steps: 1) assigning the same initial weight for all reference users, 2) calculating consensus reference data by voting among users for each time point in the harmonic user content, applying user weights on their votes (higher-weighted users have more votes), 3) estimating the accuracy of each user by calculating the portion of time that each user's harmonic user content agrees with the consensus reference data calculated in the previous step, 4) estimating dependencies between users by calculating how often users agree at times where their harmonic user content does not agree with the consensus reference data (and therefore the users are considered to make the same errors), 5) adjusting the weights of the users according to their accuracy (more accurate users getting more weight) and their dependency (dependent users getting less weight), 6) repeating from step 2 until the consensus reference data does not change, or a pre-defined maximum number of repetitions is reached, 7) using the resulting consensus reference data as the crowd-sourced reference data. The initial weights for reference users may be assigned based on metadata about the users, such as their skill level or their performance history.

Figure 2:
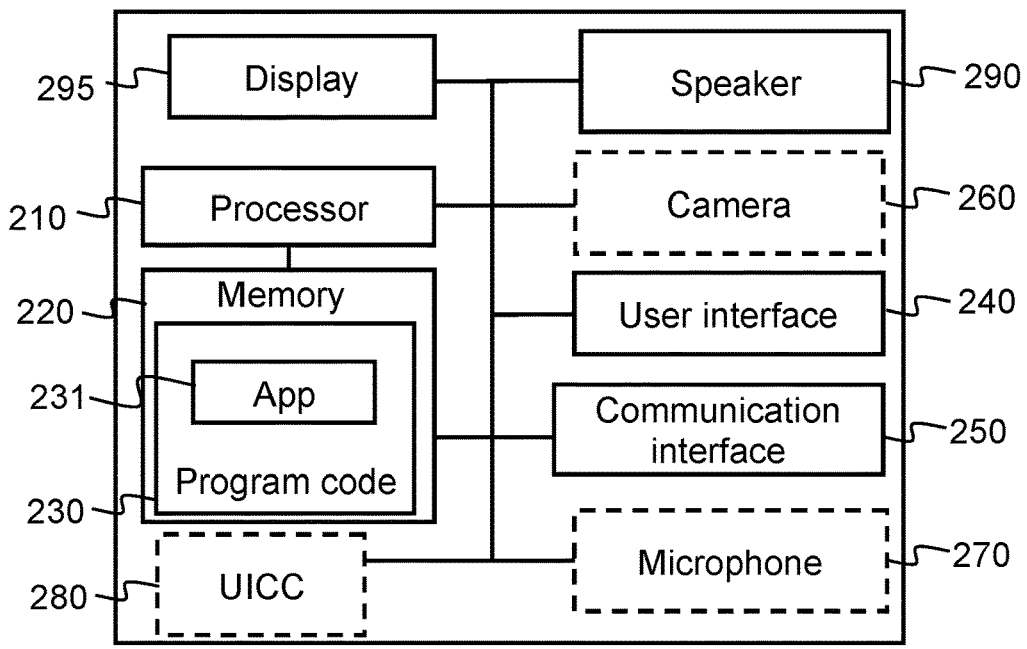
FIG. 2 presents an example block diagram of a user device.

FIG. 2 presents an example block diagram of a user device 110 (or reference user device 170), in which various aspects of the disclosed embodiments may be applied. The user device 110 may be a user equipment (UE), user device or apparatus, such as a mobile terminal, a smart phone, a smart TV, a phablet, a tablet, or other communication device comprising a communication interface and a user interface.

The general structure of the user device 110 comprises a user input device 240, a communication interface 250, a microphone 270, a camera 260, a processor 210, and a memory 220 coupled to the processor 210. The user device 110 further comprises software 230 stored in the memory 220 and operable to be loaded into and executed in the processor 210. The software 230 may comprise one or more software modules, such as a music instrument training module 231 that may comprise a client application for receiving music track information, generating harmonic music track parameters based on the received music track information, displaying notation information for a user for performing the music track at a given time for the music track based on the harmonic music track parameters, receiving harmonic user content generated by an instrument performed by the user, using at least one capturing device, generating real-time performance feedback for the user based on comparison of the harmonic user content and the harmonic music track parameters according to predefined settings, receiving reference harmonic user content from a plurality of reference users over a public network; and adjusting, based on the reference harmonic user content, at least one of the following: the harmonic music track content and the harmonic music track parameters.

The music instrument training module 231 can be in the form of a computer program product. The user device 110 may further comprise a universal integrated circuit card (UICC) 280.

In an embodiment, the user device 110 may comprise a display 295 for presenting information to a user of the device 110. In case the user device 110 does not comprise the display 295, an external A/V apparatus may be used for presenting information.

The processor 210 may be, e.g., a central processing unit (CPU), a microprocessor, a digital signal processor (DSP), a graphics processing unit, or the like. FIG. 2 shows one processor 210, but the user device 110 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The user device 110 may comprise a plurality of memories. The memory 220 may be constructed as a part of the user device 110 or it may be inserted into a slot, port, or the like of the user device 110 by a user. The memory 220 may serve the sole purpose of storing data, or it may be constructed as a part of an apparatus serving other purposes, such as processing data. Client application data for different services provided by service providers may be stored and run in the memory 220 as well as other user device 110 application data. A client application 111 is one such software application run by the processor with the memory.

The user input device 240 may comprise circuitry for receiving input from a user of the user device 110, e.g., via a keyboard, a touch-screen of the user device 110, speech recognition circuitry, gesture recognition circuitry or an accessory device, such as a headset or a remote controller, for example.

The camera 260 may be a still image camera or a video stream camera, capable for creating multimedia data. The device 110 may comprise several cameras, for example a front camera and a rear camera, or an internal camera and an external camera. The user of the device 110 may select the used camera 260 via settings of the device 110 or the client application within the device 110.

The speaker 290 is configured to notify a user of and to provide other user alarm sounds. The speaker 290 also allows the user hear the track to be played with the instrument 120.

The microphone 270 is configured to capture audio stream of the user playing the instrument 120, for example.

In an embodiment, the microphone 270 may be used to disable the speaker 290 when identical audio output is detected, using the microphone 270, from an external source, such as the capturing device 160. The device speaker 290 may only be required when the capturing device 160 microphone is switched off or operating at very low volumes. The identical audio output may be detected based on audio data comparison and based on distance calculation the audio data source may be determined to be the user device 110 instead of the instrument 120 and the speaker 290 may be switched off automatically.

In an embodiment, the universal integrated circuit card (UICC) 280 is the smart card used in mobile terminals in GSM, UMTS or 5G networks. The UICC 280 ensures the integrity and security of all kinds of personal data, and it typically holds a few hundred kilobytes. In a GSM network, the UICC 280 contains a SIM application and in a UMTS network the UICC 280 contains a USIM application, for example. The UICC 280 may contain several applications, making it possible for the same smart card to give access to both GSM and UMTS/5G networks, and also provide storage of a phone book and other applications. It is also possible to access a GSM network using a USIM application and it is possible to access UMTS/5G networks using a SIM application with mobile terminals prepared for this.

The communication interface module 250 implements at least part of data transmission. The communication interface module 250 may comprise, e.g., a wireless or a wired interface module. The wireless interface may comprise such as a WLAN, Bluetooth, infrared (IR), radio frequency identification (RF ID), NFC, GSM/GPRS, CDMA, WCDMA, LTE (Long Term Evolution) or 5G radio module. The wired interface may comprise such as universal serial bus (USB), HDMI, SCART or RCA, for example. The communication interface module 250 may be integrated into the user device 110, or into an adapter, card or the like that may be inserted into a suitable slot or port of the user device 110. The communication interface module 250 may support one radio interface technology or a plurality of technologies. The communication interface module 250 may support one wired interface technology or a plurality of technologies. The user device 110 may comprise a plurality of communication interface modules 250.

A skilled person appreciates that in addition to the elements shown in FIG. 2, the user device 110 may comprise other elements, such as additional microphones, extra speakers, extra cameras, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the user device 110 may comprise a disposable or rechargeable battery (not shown) for powering when external power if external power supply is not available.

In an embodiment, the user device 110 comprises speech or gesture recognition means. Using these means, a predefined phrase or a gesture may be recognized from the speech or the gesture and translated into control information for the user device 110, for example.

Figure 3:
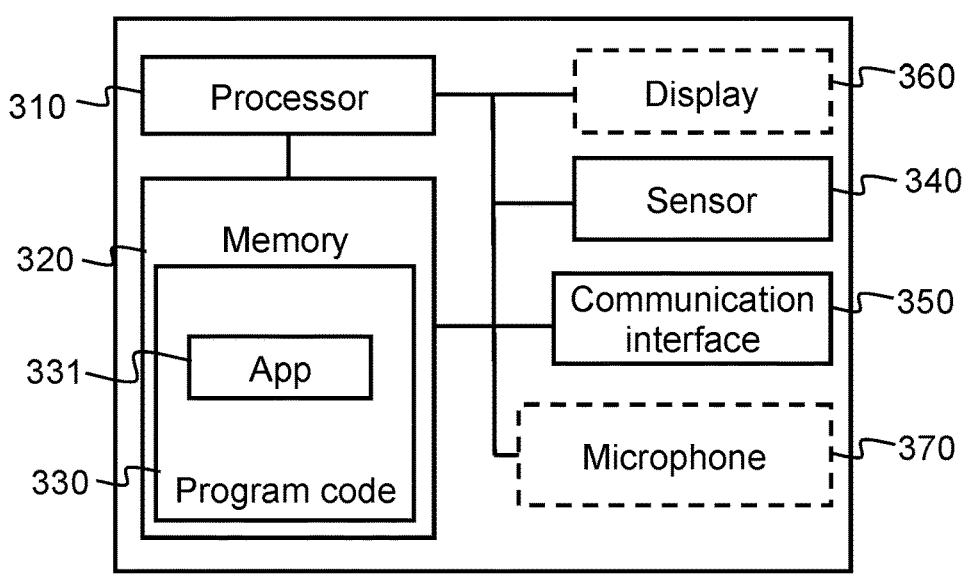
FIG. 3 presents an example block diagram of a capturing device.

FIG. 3 presents an example block diagram of a capturing device 160 in which various aspects of the disclosed embodiments may be applied. The capturing device 160 may be a microphone device or a camera device comprising a communication interface.

The general structure of the capturing device 160 comprises a communication interface 350, a processor 310, and a memory 320 coupled to the processor 310. The capturing device 160 further comprises software 330 stored in the memory 320 and operable to be loaded into and executed in the processor 310. The software 330 may comprise one or more software modules, such as music instrument capturing module 331 that may be comprised by a client application, and can be in the form of a computer program product.

The capturing device 160 may further comprise a display 360 and a microphone 370.

The processor 310 may be, e.g., a central processing unit (CPU), a microprocessor, a digital signal processor (DSP), a graphics processing unit (GPU), or the like. FIG. 3 shows one processor 310, but the capturing device 160 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The capturing device 160 may comprise a plurality of memories. The memory 320 may be constructed as a part of the capturing device 160 or it may be inserted into a slot, port, or the like of the capturing device 160 by a user. The memory 320 may serve the sole purpose of storing data, or it may be constructed as a part of an apparatus serving other purposes, such as processing data.

The sensor 340 may comprise an imaging sensor used for still image or video stream capturing.

In an embodiment, the capturing device 160 may further comprise loudspeaker or multiple loudspeakers with wired or wireless connections. Furthermore, the speaker(s) may comprise a jack for headphones and the headphones.

The display 360 may comprise a LED screen, a LCD screen or a plasma screen, with touch sensitive features or without, for example.

The communication interface module 350 implements at least part of data transmission. The communication interface module 350 may comprise, e.g., a wireless or a wired interface module. The wireless interface may comprise such as a WLAN, Bluetooth, infrared (IR) or radio frequency identification (RF ID) radio module. The wired interface may comprise such as universal serial bus (USB), HDMI, SCART or RCA, for example. The communication interface module 350 may be integrated into the capturing device 160, or into an adapter, card or the like that may be inserted into a suitable slot or port of the capturing device 160. The communication interface module 350 may support one radio interface technology or a plurality of technologies. The capturing device 160 may comprise a plurality of communication interface modules 350.

A skilled person appreciates that in addition to the elements shown in FIG. 3, the capturing device 160 may comprise other elements, such as microphones, speakers, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the capturing device 160 may comprise a disposable or rechargeable battery (not shown) for powering when external power if external power supply is not available.

Figure 4:
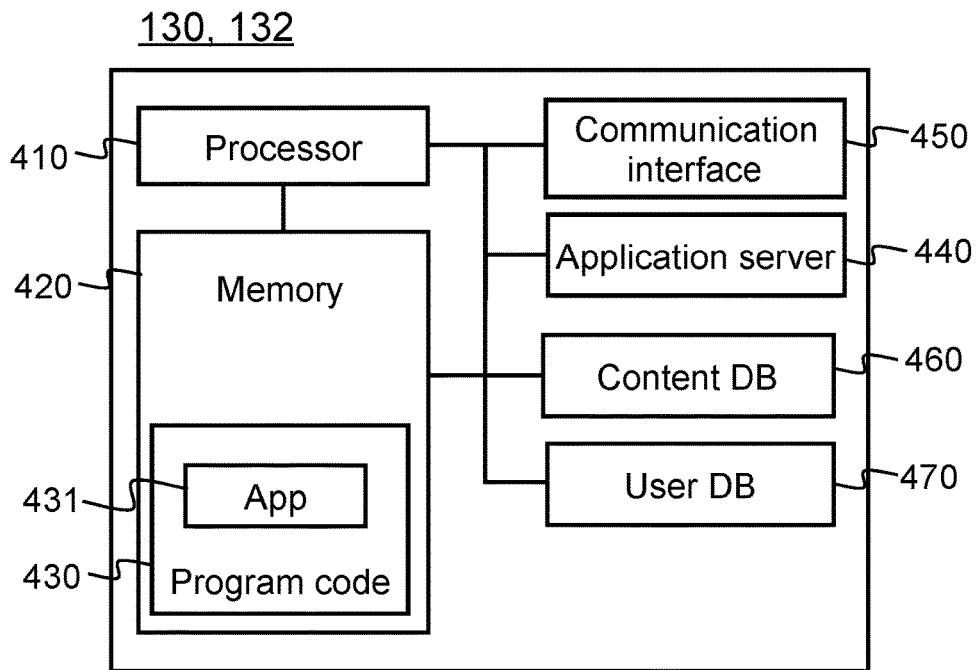
FIG. 4 presents an example block diagram of a system server.

FIG. 4 presents an example block diagram of a system server 130, 132 in which various aspects of the disclosed embodiments may be applied.

The general structure of the system server 130 comprises a processor 410, and a memory 420 coupled to the processor 410. The server 130 further comprises software 430 stored in the memory 420 and operable to be loaded into and executed in the processor 410. The software 430 may comprise one or more software modules such as music instrument training module 431 that may be used for music track training service and can be in the form of a computer program product.

The processor 410 may be, e.g., a central processing unit (CPU), a microprocessor, a digital signal processor (DSP), a graphics processing unit, or the like. FIG. 4 shows one processor 410, but the server 130, 132 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The system server 130 may comprise a plurality of memories. The memory 420 may be constructed as a part of the system server 130 or it may be inserted into a slot, port, or the like of the system server 130. The memory 420 may serve the sole purpose of storing data, or it may be constructed as a part of an apparatus serving other purposes, such as processing data.

The communication interface module 450 implements at least part of data transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface module 450 may be integrated into the server 130, or into an adapter, card or the like that may be inserted into a suitable slot or port of the system server 130. The communication interface module 450 may support one radio interface technology or a plurality of technologies.

Configuration information between the user device 110 and the system server 130 may be transceived using the communication interface 450. Similarly, account creation information between the system server 130 and a service provider may be transceived using the communication interface 450.

An application server 440 provides application services e.g. relating to the user accounts stored in a user database 470 and to the service information stored in a service database 460.

A skilled person appreciates that in addition to the elements shown in FIG. 4, the system server 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

In an embodiment, a user provides selection information via user interface 240 of the user device 110, and the selection information is configured to control which music track and instrument is to be used. Furthermore, the user input may define whether video input signals and audio input signals captured by a user device 110 or by a capturing device 160 is to be used.

FIG. 5 shows a functional diagram of an exemplary method for analyzing playing of a user in connection with an example embodiment.

The system receives a signal input 510 from a microphone or some other input, such as a camera. The signal is then converted 520 into parameter data. This data shows e.g. information on the frequency components of the signal and their amplitudes, i.e. pitch and salience, and it may also include information on timing, volume, duration, style of playing (like staccato) or up vs. down strumming in guitar. Further, parameter data may include melody, harmony, rhythm, tempo, meter, articulation, dynamics and the sonic qualities of timbre and texture. While the signal may include such many different types of parameters, FIG. 5 illustrates an example where signal frequency is a parameter. However, the other types of parameters, such as ones listed above, can naturally be processed in a corresponding manner.

The input signal 510 may also be a digital signal received from the music instrument, e.g. from a MIDI interface of the instrument. In such a case the required signal parameters can be achieved from the digital signal directly or with digital processing.

Note/interval/chord events are received from the exercise data 530. The interval and chord data is mapped into notes 540, based on conversion information on a database 545. The notes are further mapped into frequencies 550. Before the evaluation 570 the latency of the signals is compensated 560. The system uses the information on which are the correct frequency components and sums weighed amplitude values of these frequency components of the played signal 570. The result is scaled and a point score is achieved 580.

It is possible that the exercise data includes other parameters in addition to frequency and amplitude values of frequency components i.e. pitch and salience, such as timing, duration, volume or style of playing, melody, harmony, rhythm, tempo, meter, articulation, dynamics and the sonic qualities of timbre and texture. Such parameters can then also be compared to the audio signal parameters of playing and achieve further characteristics of the playing. If the exercise data in the form of MIDI exercise files, the file may contains basic note information (note on and note off messages) that can be mapped into frequencies. A MIDI exercise file may also include also other exercise parameters such as timing of notes, intervals, and/or chords as well as other parameters described above.

The described analysis method allows analyzing intervals and chords, i.e. several simultaneous notes. However, other alternative analysis methods may also be used such as pattern matching method, for example.

The techniques for recognizing notes from an acoustic signal can be self learning based on collected audio data. Such audio data can be specifically provided to the system, but such data can also be collected from the playing of the users. The acoustic data recorded from the users as well as other collected data can be thus used for optimizing the system and for detecting error situations.

FIG. 6 shows a functional diagram of an exemplary method for analyzing playing of a user in connection with an example embodiment.

In step 610, a user has access to digital audio of a music track. The user may, for example, have digital audio information of the music track available within user device or a cloud service, for example. Digital data may be received from a cloud source 611, a local source 612 or generated on the fly by recording in real time (RT) 613. Real time recording may be done based on user playing or singing the music track, for example. The digital audio may be pre-processed to provide music track information for different embodiments.

In step 620, harmonic music track parameters are generated based on the received music track information. Generation may be done by a client application 111 (FIG. 1) at the user device 110 (FIG. 1) or the server application 133 (FIG. 1) at the server apparatus 130, 132 (FIG. 1), for example. The client application 111 or the server application 133 may analyze the harmonic content of the music track and generate the harmonic music track parameters. The harmonic parameters for the music track may be stored in step 625 to parameters database associated with the music track information or the digital audio, for example.

In step 630, the client application is configured to provide the music track to the user and simultaneously display notation information for the user for performing the music track at a given time based on the harmonic music track parameters. Furthermore, the client application 111 may automatically generate performance feedback to the user. Optionally, if the client application 111 is uncertain about the correct performance at a certain point of the music track, it may hide the performance information there, or show several candidate instructions at those places.

In step 640, the user performs a musical performance along with the music track played back in step 630 and the client application 111 records the user's musical performance by receiving harmonic user content generated by an instrument performed by the user, using at least one capturing device.

In step 650, the client application 111 analyzes the harmonic content of the musical performance in real-time for short temporal audio segments and compares that with harmonic content from the music track. If the user performance matches with the musical piece, software gives positive feedback to the user. Real-time performance feedback is generated by the client application 111 for the user based on comparison of the harmonic user content and the harmonic music track parameters according to predefined settings 655.

In step 660, the client application 111 stores the analysis results of the user performance based on step 650. The analysis results may be stored to content database 665 locally by the client application 111 at the user device 110 or remotely by the server application 132 at the server apparatus 130, 132. The results of the content database 665 may be used for updating reference performance database 670, for example.

In step 670, reference harmonic user content is received from a plurality of reference users over a public network. Given that a plurality of users have performed along with the same musical piece, performance analysis results (reference harmonic user content) of those users may be made available for other users within the system 100. The reference harmonic user content may be maintained at the server apparatus 130, 132 and selectively fetched and stored to the user device 110, for example.

In step 675, the client application 111 or the server application 133 may perform combining of performance analysis results.

The combination step combines the performance analysis results to provide more accurate feedback for new user performances.

In step 680, the client application 111 or the server application 133 may, based on the combined user performances in step 675, gather data about the most erroneous parts of the analysis and (e.g. randomly) request other users to evaluate and the correctness of the automatically-generated analysis to enable confirmation of the data. Step 680 may be optional or automatic.

In step 690, the client application 111 or the server application 133 adjusts, based on the reference harmonic user content (combination of it in step 675), at least one of the following: the predefined settings 655 and the harmonic music track parameters 625.

FIG. 7 shows a functional diagram of an exemplary method for analyzing singing performance of a user in connection with an example embodiment.

In step 710, a user has access to digital audio of a music track. A client application 111 (FIG. 1) at the user device 110 (FIG. 1) or the server application 133 (FIG. 1) at the server apparatus 130, 132 (FIG. 1) receives user selection information for a song and may also receive audio of the song. As an example (not limited to), the user could sing the song along with a publicly available video service 711 (e.g. YouTube™) video that contains also lyrics information for the song. Instead of video, an audio source (such as SoundCloud™) could be used.

The user may, for example, have digital audio information of the song available within user device or a cloud service, for example. Digital data may be received from a cloud source, a local source 712 or generated on the fly by recording in real time (RT) 713. Real time recording may be done based on user singing the music track, for example. The real-time recording can be done by another user, for example a teacher or other skilled person. The digital audio may be pre-processed to provide music track information for different embodiments.

In step 720, the client application 111 or the server application 133 analyzes the song's harmonic content and measures a set of possible melody pitches in consecutive time segments of the digital audio. The client application 111 or the server application 133 may analyze the harmonic content of the song and generate the harmonic music track parameters. The harmonic parameters for the music track may be stored in step 725 to parameters database associated with the song information or the digital audio, for example. Parameters of the song, such as the melody pitches may be stored to the parameters database 725.

In step 730, the client application 111 is configured to provide the song to the user and simultaneously display notation information for the user for performing the song at a given time based on the harmonic music track parameters. Furthermore, the client application 111 may automatically generate performance feedback to the user. Optionally, if the client application 111 is uncertain about the correct performance at a certain point of the song, it may hide the performance information there, or show several candidate instructions at those places.

In step 740, the user performs a musical performance sing along with the music track played back in step 730 and the client application 111 records the user's musical performance by receiving harmonic user content of user's vocal, using at least one microphone.

In step 750, the client application 111 analyzes the harmonic content of the user's vocal in real-time for short temporal audio segments and compares that with harmonic content from the music track.

While user is singing, the client application 111 measures the pitch of user singing. If singing pitch is near to a possible melody pitch measured from the song, the client application 111 generates positive feedback information for the user. Real-time performance feedback may be generated by the client application 111 for the user based on comparison of the harmonic user content and the harmonic music track parameters according to predefined settings 755.

In step 760, the client application 111 stores the analysis results of the user performance based on step 750. The analysis results may be stored to content database 765 locally by the client application 111 at the user device 110 or remotely by the server application 132 at the server apparatus 130, 132. The results of the content database 765 may be used for updating reference performance database 770, for example.

In step 770, reference harmonic user content is received from a plurality of reference users over a public network. Given that a plurality of users have been singing along with the same song, performance analysis results (reference harmonic user content) of those singers may be made available for other users within the system 100. The reference harmonic user content may be maintained at the server apparatus 130, 132 and selectively fetched and stored to the user device 110, for example.

In step 775, the client application 111 or the server application 133 may perform combining of performance analysis results.

The combination step combines the performance analysis results to provide more accurate feedback for new singers singing the same song later on.

Furthermore, if the client application 111 or the server application 133 has gathered singing analysis results from a plurality of users, the combination step 775 and related analysis may identify that certain melody pitches should be considered as correct melody according to users' popular vote (e.g. consensus regarding what they sing) as illustrated by step 780 of consenting. Eventually, the system is configured to provide very accurate feedback to singers if they perform the melody of the song. In steps 750-775 it is also important to gather information where the users are not singing, and to determine the audio segments where there is no melody to be performed.

Optionally in step 780, the client application 111 or the server application 133 may receive rating information from other users in relation to other user's performances, and weight information may be determined and associated with highly-rated performances to adjust system settings or parameters used later on other users.

Similar approach can be used to analyze user-played musical chords, for example. It is easier to determine the chords for a musical recording when the system has access to the audio of many users playing along with the song using guitar or piano, for example. That is because the performances of the users provide additional information about the original song.

In step 790, the client application 111 or the server application 133 adjusts, based on the reference harmonic user content (combination of it in step 675), at least one of the following: the predefined settings 755 and the harmonic music track parameters 725.

Figure 8:
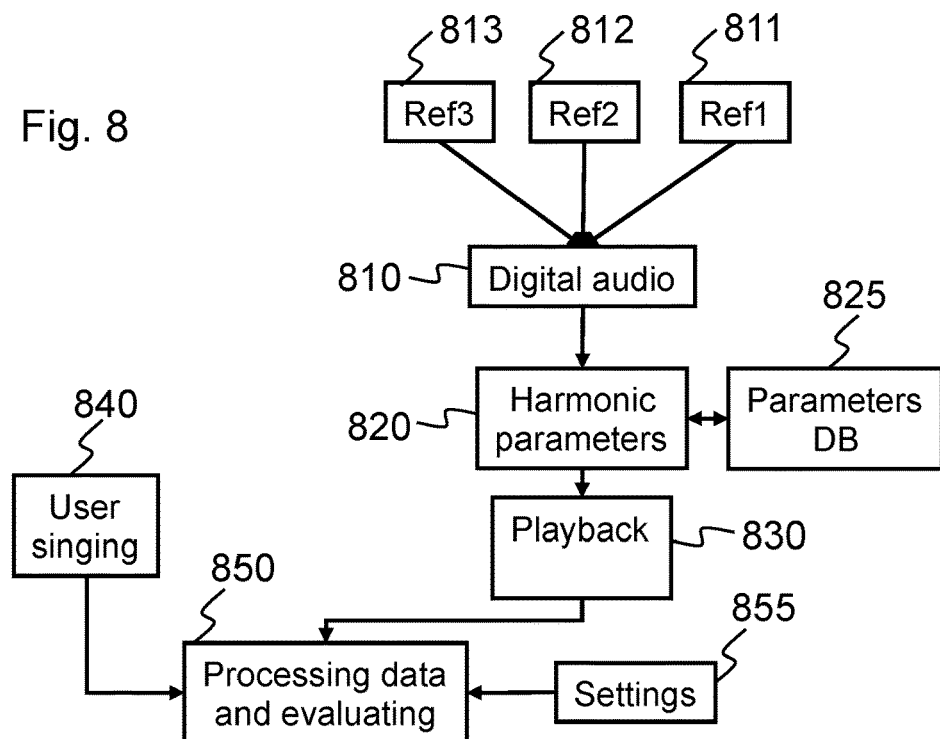
FIG. 8 shows a functional diagram of an exemplary method for analyzing musical expression of a user in connection with an example embodiment.

FIG. 8 shows a functional diagram of an exemplary method for analyzing musical expression of a user in connection with an example embodiment.

In step 810, the client application 111 or the server application 133 is configured to receive music track information. Furthermore, the client application 111 or the server application 133 is configured to receive reference harmonic user content from at least one dedicated user 811-813. The reference harmonic user content may be generated by an administrator of the system 100 reference harmonic user content.

In an embodiment, the harmonic user content may comprise also expressive parameters of the performance, such as timing, dynamics (loudness), or musical effects applied on each note (vibrato etc.). Such expressive performance parameters may be used for different embodiments.

The client application 111 or the server application 133 may be configured to generate harmonic music track parameters based on the received music track information from dedicated user(s) 811-813.

In step 820, harmonic music track parameters are generated based on the received music track information and an accurate notation for the music track (song) is generated (the aim here may not be to improve it via crowdsourcing).

The client application 111 or the server application 133 may record several expert performances for the song, and the performances may be performed with expression, for example. Harmonic music track parameters are generated in step 820 based on the received music track information and stored to database in step 825.

In step 830, notation information is displayed on the user interface for a user for performing the music track (song) at a given time for the music track based on the harmonic music track parameters.

If the aim is to learn expressive tempo variation, the reference users 811-813 (experts, and later the user as well) may perform the music track (song) without a backing track (accompaniment). Otherwise, they may perform with a backing track, for example to apply expressive dynamic (loudness) variation, or use of vibrato or tone color variation.

In step 840, harmonic user content is generated based on user vocal received by microphone and in step 850 real-time performance feedback is generated for the user based on comparison of the harmonic user content and the harmonic music track parameters.

In step 850, the client application 111 analyzes the harmonic content of the user's vocal in real-time for short temporal audio segments and compares that with harmonic content from the reference data 811-813.

Feedback is generated on user's musical expression based on several expert performances (reference harmonic user content) 811-813 as reference data.

At points of the song where the expert reference data 811-813 agree in their expression (for example all of them slowing down the tempo at a certain point), the client application 111 may require the user to do the same. At points where the expert reference data 811-813 have varying interpretations, the user is also given more freedom and flexibility, generating positive feedback across the range of variability that was seen for expert performers 811-813.

While user is singing, the client application 111 measures the pitch of user singing. If singing pitch is within the range of the melody pitch generated from reference data 811-813, the client application 111 generates positive feedback information for the user. The range information may be maintained in the parameters database 825 for any particular song, for example. This would allow to provide feedback on advanced musical aspects that cannot be turned into rules.

Real-time performance feedback may be generated by the client application 111 for the user based on comparison of the harmonic user content and the harmonic music track parameters according to predefined settings 855. The range information may also be stored to settings 855. Settings 855 may also comprise further control data for evaluating user performance in view of reference data from 811-813. For example, user level rules for evaluation may be maintained.

In an embodiment, processing and evaluation step 650, 750, 850, analysis 660, 760 and combining step 675, 775 may process data of the performance analysis results and can be determined and combined.

Performance analysis steps 650, 750, 850 may extract many different parameters. Pitch data (including vibrato and bends for example) is often the most important. For singing performances for example, extracting the pitch track (pitch as a function of time) is the main data processed.

Furthermore, timing and tempo related data, dynamics data (such as loudness), and timbre data (such as tone color, e.g. dark/bright) may be utilized.

Performance characteristics are measured as time-varying quantities: they are measured for successive points of the performance, for example measuring pitch value 100 times per second.

In an embodiment, performance analysis steps 650, 750, 850 may further be configured to further correlate the measurements with musical time: for example how pitch varies over the course of a long sung note, or how loudness of played guitar chords correlates with the metrical position of those chords (beginning of measure vs. a weak beat).

For combining step 675, 775, if the users perform along with a backing track (or click track), the performances are already temporally synchronized, and each time point in a certain performance corresponds directly to the same time point in other performances. If the users perform without a backing track, then the performances need to be temporally synchronized by the client application 111 or the server application 133 to a reference timeline, in order to know which point in the music a certain point in the recording corresponds to.

There are several ways of combining 675, 775 the performance analysis results 670, 770 from several reference users, by the client application 111 or the server application 133, after they are temporally synced.

In an embodiment, the method comprises combining the received reference harmonic user content 665, 765 to provide crowdsourcing reference data 670, 770 by median calculating, wherein values of the received reference harmonic user content are arranged in ascending order and a middle value is picked. Calculating median one optional way of combining performances. For (one-dimensional) scalar quantities such as singing pitch at a certain point in time, median can be calculated by arranging the values in ascending order and then picking the middle value. For multidimensional (vector-valued) quantities such as timbre (such as tone color), there are well established techniques for calculating the vector median.

In an embodiment, the method comprises combining the received reference harmonic user content 665, 765 to provide crowdsourcing reference data 670, 770 by histogram calculating, wherein a value range of the received reference harmonic user content is subdivided using the histogram into parts, and calculated how many times a reference performance at a pre-defined point falls into each part, and selecting the part with most values. A histogram provides another optional way for combining estimates. A histogram subdivides the possible value range into small buckets, and calculates how many times an example performance (at certain point) falls into each bucket. Then one can select the "main mode" of the histogram for example: picking the bucket that got most values.

In an embodiment, overall statistics of the data may be used for the combination 665, 765 step as well. The client application 111 or the server application 133 may determine, for example, how much variance there is among performers, or what is the overall range of variation (maximum and minimum value).

Optionally, the performances can be weighted differently when combining them. The client application 111 or the server application 133 may request users to rate each other's performances, or utilize metadata about the users, such as their estimated skill level within the application (giving more weight to the performances of skilled users). When weighting performances (based on users' rating or some other metadata), the above ways of combining data have well-established weighted versions of them (weighted median, histogram, or weighted version of basic statistics).

In an embodiment, the client application 111 or the server application 133 may be configured to assist the user to mimic one of the example performances. The other reference performances in such case would only serve to determine the possible amount of variation that there is along a certain dimension/parameter of expression, so that the client application 111 or the server application 133 can meaningfully quantify how far the user is from the target performance.

In an embodiment, harmonic parameters 620-625, 720-725, 820-825 for a music track or song and analyzed notation may be adjusted automatically.

A short segment of the audio of a music track may be generated and provided to users by the client application 111 or the server application 133. Such provision may be enabled in step 680, 780 of FIGS. 6-7, for example.

The segment may contain a single chord or a limited amount of notes where a transcriber entity picked the chords or notes with a low confidence and there are multiple possible alternatives, when generating harmonic parameters.

In step 680, 780 the client application 111 or the server application 133 may provide a consent user with the aforementioned candidate musical notations for the segment, and request the consent user to choose the correct one from among those. For example (but not limiting to), the client application 111 or the server application 133 could provide the consent user with several candidate chords for the segment (e.g. C major, A minor, and C6). From the consent user's perspective, that would work as an ear training exercise.

When sufficiently many consent users have reached sufficient consensus on the correct transcription, the transcription data is corrected 690, 790 if necessary and parameters 625, 725 and/or settings 655, 755 are adjusted.

At the beginning, the automatic transcriber 620, 720 step may only identify a set of candidates that (sufficiently reliably) includes the correct candidate, but will not be able to give 100% accurate feedback whether user selected the correct candidate. Nonetheless, the client application 111 or the server application 133 may give feedback to the best of the transcriber's abilities.

In an embodiment, the client application 111 or the server application 133 may blend "unknown" portions (e.g. segments) among portions for which the client application 111 or the server application 133 already have reliable harmonic parameters data 620-625, 720-725.

The segments may be chosen based on user profile within the client application 111 or the server application 133 from the type of songs that are interesting to the user (based on the user activity in the client application 111), to make it more meaningful and motivating.

The segments may be chosen by the server application 133 from points in harmonic parameters data 620-625, 720-725 where crowdsourcing data is most valuable (e.g. where confidence in automatic analysis is low).

In general, using real-world data (actual songs) for musical training (as opposed to playing chords on piano, for example) has great educational advantages over using generative, artificial sources.

In an embodiment, a consent user may not be presented with alternative transcriptions, but only a target polyphonic audio segment would be played to the consent user, and the consent user would then be requested, by the client application 111 or the server application 133, to sing the melody in it, or to play the bass line in it, or play the chords in it on guitar, for example. Transcribing 620, 720 the user performance 811-813 is much easier than analyzing the original polyphonic audio.

In an embodiment, an entire song is played back for (non-beginner) consent user and possible chords (analyzed from audio) may be generated and provided to the consent user and in response the consent user plays the best matching chords based on his best judgment and the chords are received and processed by the client application 111 or the server application 133. Exact chord timings may not be presented to the consent user but rather the consent user is allowed to determine the chord change position by listening and playing along the musical piece. For example, if the consent user is provided with the automatic chord transcriptions for a video, he/she need not to follow the exact timings of chords (or sometimes erroneous chord labels) but try to listen to the song and play the chords that have the best matches. Usually on the second try, or if he/she knows the song already, he/she can play pretty much the right chords.

Figure 9:
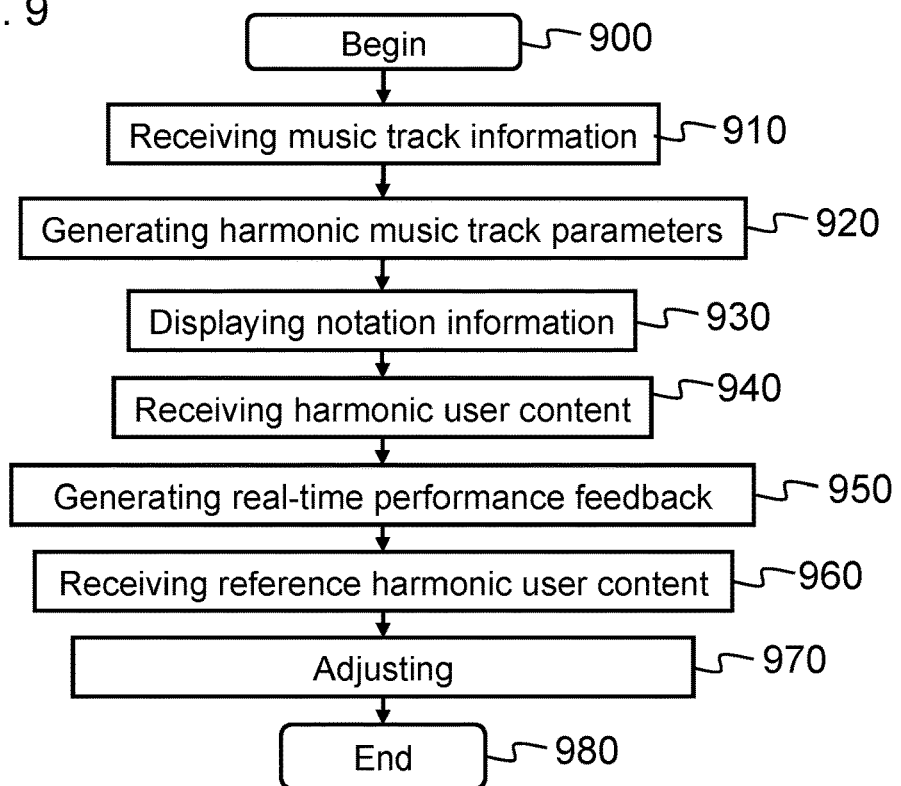
FIG. 9 shows a flow diagram showing operations in accordance with an aspect of the disclosed embodiments.

FIG. 9 shows a flow diagram showing operations in accordance with an example embodiment. In step 900, a computer implemented method for providing feedback of harmonic content relating to a music track, is started.

In step 910, music track information is received. In step 920, harmonic music track parameters are generated based on the received music track information. In step 930, notation information is displayed for a user for performing the music track at a given time for the music track based on the harmonic music track parameters. In step 940, harmonic user content generated by an instrument performed by the user is received, using at least one capturing device. In step 950, real-time performance feedback is generated for the user based on comparison of the harmonic user content and the harmonic music track parameters according to predefined settings. In step 960, reference harmonic user content is received from a plurality of reference users over a public network. In step 970, at least one of the following is adjusted based on the reference harmonic user content: the predefined settings, and the harmonic music track parameters. The method is ended in step 980.

Attribute/notation information may comprise mean data that is displayed for the user, such as notes, intervals or chords, according to which the player plays the music track/exercise. However, the exercise data given to a more experienced user may be a name of a song in minimum. Exercise data is also used for comparing with the played signal in order to evaluate the playing of the user.

In an embodiment, input information regarding a music track and an instrument is received and attribute/notation information for that particular music track and instrument is determined based on the received input information.

In an embodiment, the attribute/notation information for the particular music track and instrument may comprise musical notation for the track and the instrument.

For example, a music track and a guitar is selected and accordingly guitar chords for the music track are determined.

In an embodiment, the attribute/notation information for the particular music track and instrument may comprise operation instructions for a plurality of user operable elements of the instrument, such as keys, frets, strings or buttons. The operation instructions may be such that if the user follows the operation instructions for a plurality of user operable elements of the instrument, desired musical notation for the track and the instrument is achieved.

In an embodiment, input information may further comprise user level information. The user level information may be used to determine level of attribute information corresponding to the user level. Different levels may comprise, for example, name of the music track, tempo of the music track, musical notation of the music track, chords of the music track, and operation instructions for a plurality of user operable elements of the instrument for the music track, for example.

The hardware implementation of the apparatus or system may comprise different types of microphones, cameras, displays, and computing devices, or a mobile phone, for example. A computer with a USB microphone/webcam may also be used.

Without in any way limiting the scope, interpretation, or application of the claims appearing below, a technical effect of one or more of the example embodiments disclosed herein is an improved system for music instrument (including vocal) 120 exercise for a music track playing.

A technical effect of one or more of the example embodiments disclosed herein is that accuracy of the feedback for the user's performance (and the accuracy of the analysis of the accompanying song) is improved. Furthermore, the accuracy is further improved when the number of reference performances increases.

A further technical effect of one or more of the example embodiments disclosed herein is that no additional effort from the users' side is required, neither any human-provided annotations for feedback. The accuracy is improved especially for music pieces that are the most popular among the users, because they have the largest number of performances that can be analyzed.

Another technical effect of one or more of the example embodiments disclosed herein is an improved music instrument exercise system. Another technical effect of one or more of the example embodiments disclosed herein is improved combination of a plurality of harmonic data contents. Another technical effect of one or more of the example embodiments disclosed herein is the provision of a simplified and reliable system for providing a crowdsourced function for music instrument exercise associating a user device and a capturing device Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications that may be made without departing from the scope of the present invention as defined in the appended claims.

The invention claimed is:

1. A computer implemented method for providing feedback of harmonic content relating to a music track, comprising:
   receiving music track information;
   generating harmonic music track parameters based on the received music track information;
   displaying notation information for a user for performing the music track at a given time for the music track based on the harmonic music track parameters;
   receiving harmonic user content generated by an instrument performed by the user, using at least one capturing device;
   generating real-time performance feedback for the user based on comparison of the harmonic user content and the harmonic music track parameters according to predefined settings;
   receiving reference harmonic user content from a plurality of reference users over a public network; and
   adjusting, based on the reference harmonic user content, at least one of the following:
   the predefined settings; and
   the harmonic music track parameters.

2. The method of claim 1, further comprising:
   receiving instrument information; and
   determining notation information of the music track based on the received music track information and the instrument information, the notation information comprising instructive data for the user to perform the music track with the instrument.

3. The method of claim 1, wherein the instrument comprising at least one of the following:
   a musical instrument played by the user; and
   a voice of the user.

4. The method of claim 1, further comprising:
   combining the received reference harmonic user content to provide crowdsourcing reference data;
   comparing the crowdsourcing reference data with the harmonic music track content or the harmonic music track parameters; and adjusting the predefined settings, the harmonic music track content or the harmonic music track parameters based on the comparison.

5. The method of claim 4, wherein the harmonic user content comprises pitch data of user singing, and the method further comprising:
    storing the pitch data as part of the crowdsourcing harmonic user content comprising pitch data from the plurality of reference users; and
    adjusting pitch data of the harmonic music track parameters based on the crowdsourcing harmonic user content according to consensus algorithm.

6. The method of claim 4, wherein the harmonic user content comprises chord data of user playing an instrument, and the method further comprising:
    storing the chord data as part of the crowdsourcing harmonic user content comprising chord data from the plurality of reference users; and
    adjusting chord data of the harmonic music track parameters based on the crowdsourcing harmonic user content according to consensus algorithm.

7. The method of claim 1, further comprising:
    combining the received reference harmonic user content to provide reference data;
    determining at least one portion of the reference data as fixed in response to determining the received reference harmonic user content from the plurality of users being within a pre-defined range, wherein the fixed portion expressing less room for variation of user performance;
    determining at least one portion of the reference data as dynamic in response to determining the received reference harmonic user content from the plurality of users being outside the pre-defined range, wherein the dynamic portion expressing more room for variation of user performance; and
    adjusting, based on the fixed and dynamic portions, at least one of the following:
        the predefined settings; and
        the harmonic music track parameters.

8. The method of claim 1, further comprising:
    combining the received reference harmonic user content to provide crowdsourcing reference data by median calculating, wherein values of the received reference harmonic user content are arranged in ascending order and a middle value is selected.

9. The method of claim 1, further comprising:
    combining the received reference harmonic user content to provide crowdsourcing reference data by histogram calculating, wherein a value range of the received reference harmonic user content is subdivided using the histogram into parts, and calculated how many times a reference performance at a pre-defined point falls into each part, and selecting the part with most values.

10. The method of claim 1, further comprising:
    receiving instrument selection information;
    receiving track selection information; and
    determining input information regarding a music track and an instrument based on the instrument selection information and the track selection information.

11. The method of claim 1, further comprising:
    receiving reference harmonic user content of a plurality of reference users; and
    combining the received reference harmonic user content to provide crowdsourcing reference data by consensus voting, wherein the consensus voting is based on weight information of each reference user so that number of votes of a user is determined by the weight information.

12. The method of claim 11, further comprising:
    combining the received reference harmonic user content to provide crowdsourcing reference data by consensus voting, wherein the consensus voting is configured to generate the crowdsourcing reference data by voting among the plurality of reference users for a plurality of time points in the harmonic user content and by applying reference user weight information on each reference user voting.

13. The method of claim 12, further comprising:
    generating the harmonic music track parameters based on the crowdsourcing reference data combined by the consensus voting; and
    generating real-time performance feedback for the user based on comparison of the harmonic user content and the harmonic music track parameters.

14. The method of claim 12, further comprising:
    assigning same initial weight information for reference harmonic contents from each reference user; and
    adjusting weight information of at least one reference user based on accuracy information or dependency information, wherein the accuracy information is generated by using time information reflecting portion of time the reference user's harmonic user content agrees with the crowdsourcing reference data combined by the consensus voting, and the dependency information is generated by using information reflecting number of occasions how often the reference user agrees at times where the reference user's harmonic user content does not agree with the crowdsourcing reference data combined by the consensus voting.

15. The method of claim 14, further comprising:
    repeating the step of adjusting weight information until the reference data combined by the consensus voting does not change, or a pre-defined maximum number of repetitions is reached; and
    determining the resulting reference data by consensus voting as the crowdsourcing reference data.

16. The method of claim 1, further comprising:
    segmenting the visual information to generate a plurality of data segments within the visual information, wherein the plurality of data segments comprises at least a user data segment and an instrument data segment.

17. The method of claim 16, wherein the instrument data segment comprises information of a user operable element of the instrument.

18. The method of claim 17, wherein the user operable element comprises at least one of the following:
    a fret;
    a string;
    a key; and
    a button.

19. An apparatus for providing feedback of harmonic content relating to a music track, comprising:
    a communication interface;
    a user interface;
    at least one capturing device;
    at least one processor; and
    at least one memory including computer program code;
    the at least one memory and the computer program code configured to, with the at least one processor, cause the apparatus to:
        receive music track information by the communication interface;

generate harmonic music track parameters based on the received music track information;

display notation information on the user interface for a user for performing the music track at a given time for the music track based on the harmonic music track parameters;

receive, by the capturing device, harmonic user content generated by an instrument performed by the user;

generate real-time performance feedback for the user based on comparison of the harmonic user content and the harmonic music track parameters according to predefined settings;

receive reference harmonic user content from a plurality of reference users over a public network;

adjust, based on the reference harmonic user content, at least one of the following:
the predefined settings; and
the harmonic music track parameters.

20. A computer program embodied on a computer readable non-transitory medium comprising computer executable program code, which when executed by at least one processor of an apparatus, causes the apparatus to:

receive music track information by the communication interface;

generate harmonic music track parameters based on the received music track information;

display notation information on the user interface for a user for performing the music track at a given time for the music track based on the harmonic music track parameters;

receive, by the capturing device, harmonic user content generated by an instrument performed by the user;

generate real-time performance feedback for the user based on comparison of the harmonic user content and the harmonic music track parameters according to predefined settings;

receive reference harmonic user content from a plurality of reference users over a public network;

adjust, based on the reference harmonic user content, at least one of the following:
the predefined settings; and
the harmonic music track parameters.

* * * * *